United States Patent [19]

Fry

[11] Patent Number: 4,605,596
[45] Date of Patent: * Aug. 12, 1986

[54] ADDITIVE FOR COATING COMPOSITIONS

[75] Inventor: Grant C. Fry, Lake Orion, Mich.

[73] Assignee: E. I. Du Pont de Nemours and Company, Wilmington, Del.

[*] Notice: The portion of the term of this patent subsequent to May 29, 2001 has been disclaimed.

[21] Appl. No.: 562,512

[22] Filed: Dec. 19, 1983

Related U.S. Application Data

[63] Continuation-in-part of Ser. No. 451,249, Dec. 20, 1982, Pat. No. 4,451,600.

[51] Int. Cl.[4] .......................... C08K 5/11; C08K 5/34; C08F 8/30
[52] U.S. Cl. .................. 428/423.3; 252/401; 252/403; 524/91; 524/101; 524/102; 524/196; 524/213; 524/294; 524/296; 524/297; 524/321; 525/123; 525/124
[58] Field of Search ................. 524/101, 91, 102, 196, 524/294, 296, 297, 317, 376, 213, 321, 513, 35, 539; 252/401, 403; 428/423.1, 480; 544/222; 525/123, 124; 528/45

[56] References Cited

U.S. PATENT DOCUMENTS

| | | | |
|---|---|---|---|
| 3,558,564 | 1/1971 | Vasta | 528/58 |
| 3,844,993 | 10/1974 | Miller | 524/127 |
| 4,131,571 | 12/1978 | Crawley et al. | 524/91 |
| 4,168,249 | 9/1979 | Meyer | 524/296 |
| 4,315,848 | 2/1982 | Dexter et al. | 524/91 |
| 4,389,502 | 6/1983 | Fry et al. | 524/38 |
| 4,419,513 | 12/1983 | Breidenbach et al. | 544/222 |
| 4,442,256 | 4/1984 | Miller | 524/539 |

FOREIGN PATENT DOCUMENTS 120644  9/1980  Japan .................. 524/101

OTHER PUBLICATIONS

Hawley, The Condensed Chemical Dictionary, 1977, p. 497.

Sumitomo Chemical Co., Chemical Abstracts, 99: 105287w.

Primary Examiner—John Kight
Assistant Examiner—Kriellion Morgan
Attorney, Agent, or Firm—Hilmar L. Fricke

[57] ABSTRACT

An additive for coating compositions which is a blend of
(A) 20-50% by weight of a polyisocyanate of one of the following formulas:

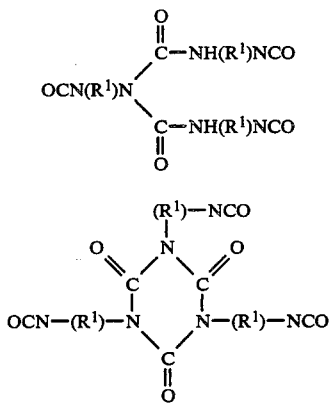

where $R^1$ is $(CH_2)_6$,
(B) 1-15% by weight of an ester of a polyalkylene glycol alkyl alkylate, an alkyl phthalate or an alkyl aromatic phthalate
(C) 1-10% by weight of a blend of ultraviolet light stabilizers and
(D) 25-78% by weight of organic solvent; the additive can be added to acrylic lacquers, nitrocellulose lacquers, acrylic-alkyd enamels and acrylic polyurethane enamels to provide flexible finishes for flexible substrates used in automobile and truck bodies.

10 Claims, No Drawings

1 …

ADDITIVE FOR COATING COMPOSITIONS

CROSS REFERENCE TO RELATED APPLICATIONS

This application is a continuation-in-part of Ser. No. 451,249, filed Dec. 20, 1982, now U.S. Pat. No. 4,451,600.

BACKGROUND OF THE INVENTION

This invention relates to an additive for coating compositions which imparts flexibility to finishes formed from coating composition containing the additive.

For painting and refinishing of automobiles and trucks, the following paints are sold: acrylic lacquers as described in Meyer U.S. Pat. No. 4,168,249 issued Sept. 18, 1979, nitrocellulose lacquers, acrylic alkyd enamels as described in Miller U.S. Pat. No. 3,844,993 issued Oct. 29, 1974 and acrylic polyurethane enamels as described in Vasta U.S. Pat. No. 3,558,564 issued Jan. 26, 1971. These lacquers and enamels have a low level of flexibility and are primarily designed for application over rigid metal parts of automobiles and trucks. However, there are a number of parts of automobile and truck bodies that use flexible materials such as the flexible material covering the area between the bumper and the body of an automobile. When the aforementioned enamels or lacquers are applied over this flexible material and the material is flexed, the enamel or lacquer cracks, chips and peels off. A universal additive is needed that would form flexible finishes of these enamels and lacquers but would not degrade other important properties such as adhesion, weatherability, gasoline resistance, gloss and distinctness of image.

SUMMARY OF THE INVENTION

An additive for coating compositions which is a mixture of about (A) 20-50% by weight of one of the following polyisocyanates:

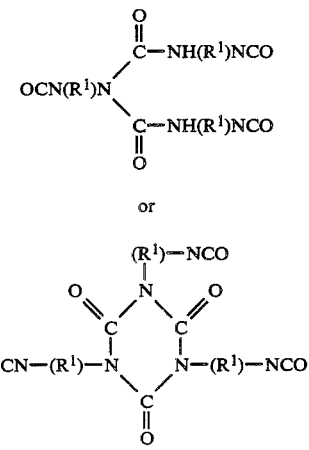

where $R^1$ is $(CH_2)_6$ (B) 1-15% by weight of an ester selected from the group of a polyalkylene glycol alkyl alkylate, an alkyl phthalate or an alkyl aromatic phthalate,
(C) 1-10% by weight of a blend of ultraviolet light stabilizers and
(D) 25-78% by weight of an organic solvent.

DESCRIPTION OF THE INVENTION

The additive of this invention can be blended with the following coating compositions: acrylic lacquers, nitrocellulose lacquers, acrylic alkyd enamels and acrylic polyurethane enamels and provides finishes with excellent flexibility. The additive does not degrade other properties of these finishes such as gloss, adhesion, weatherability and gasoline resistance. Typically useful lacquer and enamel coating compositions are described in the aforementioned patents to Meyer, Miller and Vasta and the disclosure of these patents is hereby incorporated by reference.

Usually about 10-100% by weight, based on the weight of the coating composition, of the additive is blended with the coating composition. Preferably, about 20 to 70% by weight of the additive is used. Generally, about 2 parts by weight of acrylic or nitrocellulose lacquer are used per 1 part additive, 8 parts by weight acrylic alkyd enamel per 1 part of additive are used and 4 parts by weight of acrylic polyurethane enamel per 1 part additive are used.

The addition of the additive decreases the "pot" life of the coating composition. Generally, the aforementioned lacquers containing the additive must be used within about 4 hours after addition of the additive before the lacquer increases in viscosity or gels. The above enamels have a "pot" life of about 8 hours after addition of the additive.

The additive contains about 20-50% by weight, based on the weight of the additive, of a polyisocyanate. One useful polyisocyanate has the formula

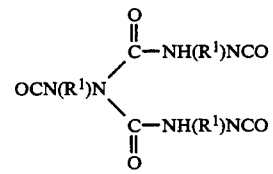

where $R^1$ is $(CH_2)_6$.

Another useful polyisocyanate has the following formula

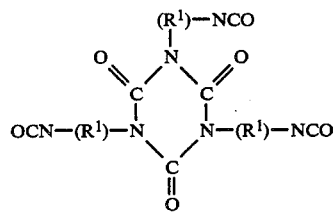

where $R^1$ is $(CH_2)_6$.

The above polyisocyanate is 1,3,5-tris(6-isocyanatohexyl)1,3,5-triazine 2,4,6(1H, 3H, 5H)trione. Commercially available polyisocyanate compositions contain the above polyisocyanate and small amounts of higher molecular weight moieties such as dimers, trimers and hexamers of the polyisocyanate. Preferably, about 25 to 40% by weight of the polyisocyanate is used.

The additive contains 1-15% by weight, based on the weight of the additive of a polyalkylene glycol alkyl acrylate, an alkyl phthalate or an alkyl aromatic phthalate. Preferably, about 4 to 10% by weight of the polyalkylene glycol alkyl acrylate is used. Typically, polyethylene glycol di(2-ethylhexoate) is used. A typical alkyl phthalate that can be used is dioctyl phthalate and a typical alkyl aromatic phthalate is butyl benzyl phthalate.

The additive contains about 1–10% by weight based on the weight of the additive, of ultraviolet light stabilizers. Preferably, 5 to 10% by weight of ultraviolet light stabilizers are used.

Typical ultraviolet light stabilizers that are useful in the additive are as follows:

Benzophenones such as hydroxydodecycl benzophenone, 2,4-dihydroxybenzophenone, hydroxybenzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic monoesters of 2,2',4-trihydroxy-4'-alkoxybenzophenone, 2-hydroxy-4-methoxy-2'-carboxybenzophenone;

Triazoles such as 2-phenyl-4-(2'-4'-dihydroxybenzoyl)triazoles, substituted benzotriazoles such as hydroxyphenyltriazoles such as 2-(2'-hydroxy-5'-methylphenyl)benzotriazole, 2-(2'-hydroxyphenyl)benzotriazole, 2-(2'-hydroxy-5'-octylphenyl)naphthotriazole;

Triazines such as 3,5-dialkyl-4-hydroxyphenyl derivatives of triazine, sulfur-containing derivatives of dialkyl-4-hydroxyphenyltriazines, hydroxyphenyl-1,3,5-triazines and such triazines containing sulfonic acid groups, aryl-1,3,5-triazines, orthohydroxyaryl-s-triazine;

Benzoates such as dibenzoate of diphenylolpropane, t-butyl benzoate of diphenylolpropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'-hydroxybenzoyl)benzene, metal derivatives of 3,5-di-t-butyl-4-hydroxyphenylpropionic acid, asymmetrical oxalic acid diarylamides, alkylhydroxyphenylthioalkanoic acid esters, dialkylhydroxyphenylalkanoic acid esters of di- and tri-pentaerythritol, phenyl- and naphthlene-substituted oxalic acid diamides, methyl-β-(3,5-di-t-butyl-4-hydroxyphenyl)propionate, α,α'-bis(2-hydroxyphenyl)-diisopropylbenzene, 3,5'-dibromo-2'-hydroxyacetophenone, ester derivatives of 4,4-bis(4'-hydroxyphenyl)pentanoic acid wherein there is at least one unsubstituted position ortho to the aromatic hydroxyl groups, organophosphorus sulfides such as bis(diphenylphosphinothioyl)monosulfide and bis(diphenylphosphinothioyl)disulfide, 4-benzoyl-6-(dialkylhydroxybenzyl)resorcinol, bis(3-hydroxy-4-benzoylphenoxy)diphenylsilane, bis(3-hydroxy-4-benzoylphenoxy)dialkylsilane, 1,8-naphthalimides, α-cyano-β,β-diphenylacrylic acid derivatives, bis(2-benzoxazolyl)alkanes, bis(2-napthoxazolyl)alkanes, methylene malonitriles containing aryl and heterocyclic substitutes, alkylenebis(dithio)carbamate, 4-benzoyl-3-hydroxyphenoxyethyl acrylate, 4-benzoyl-3-hydroxyphenoxyethyl methacrylate, aryl- or alkyl-substituted acrylonitriles, 3-methyl-5-isopropylphenyl-6-hydroxycoumarone.

Particularly useful ultraviolet light stabilizers that can be used are hindered amines of piperidyl derivatives such as those disclosed in Murayama et al., U.S. Pat. No. 4,061,616, issued Dec. 6, 1977, column 2, line 65, through column 4, line 2, and nickel compounds such as [1-phenyl-3-methyl-4-decanoylpyrazolate(5)]-Ni, bis[-phenyldithiocarbamato]-Ni(II), and others listed in the above patent, column 8, line 44 through line 55.

The following blend of ultraviolet light stabilizers is particularly preferred 2-[2'-hydroxy-3',5'-1(1-1-dimethyl-propyl)phenyl]benzotriazole and di-[4-(2,2,6,6,-tetramethylpiperidyl)]sebecate. The stabilizers can be used in any ratio however, a 2:1 ratio of benzotriazole to sebacate is preferred.

The additive contains about 25–78% by weight, based on the weight of the additive of organic solvents. Preferably, about 40 to 66% by weight of organic solvents are used. Typically useful solvents are toluene, xylene, ethyl acetate and other organic solvents that do not contain hydroxyl groups or carboxyl groups.

After the additive is blended with a coating composition, the resulting blend is applied by conventional technique such as spraying, electrostatic spraying, brushing, dipping and the like to a substrate and dried at ambient temperatures. Typical flexible substrates to which these compositions can be applied are flexible thermoplastic polyurethane and injection molded polyurethanes. Low baking temperatures of 50°–125° C. can also be used to force dry the composition. The resulting finishes have good flexibility and retain the other good properties of the composition to which they were added.

The following examples illustrate the invention. All parts and percentages are on a weight basis unless otherwise indicated.

EXAMPLE 1

The following constituents were blended together to form the additive of this invention:

|  | Parts By Weight |
|---|---|
| Ethyl acetate | 70.51 |
| Diethylene glycol monobutyl ether | 7.90 |
| Toluene | 74.03 |
| Polyethylene glycol di (2-ethylhexoate) | 10.52 |
| 2-[2'-hydroxy-3',5'-1(1-1-dimethyl-propyl)phenyl] benzotriazole | 7.88 |
| Di-[4-(2,2,6,6,-tetramethyl-piperidyl)]sebacate | 3.95 |
| Desmodur ® L2291-trimer of hexamethylene diisocyanate of the formula | 92.18 |
| Total | 266.97 |

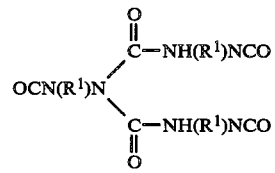

where $R^1$ is $(CH_2)_6$

A white acrylic lacquer was prepared by blending together the following ingredients:

|  | Parts By Weight |
|---|---|
| Mixed methyl esters of succinic, glutaric and adipic acids | 16.71 |
| Isopropanol | 22.34 |
| Xylene | 31.97 |
| Alkyd Resin Solution (85% solids in toluene of an alkyd resin of coconut oil/ | 36.60 |

-continued

| | Parts By Weight |
|---|---|
| ethylene glycol/phthalic anhydride having a Gardner Holdt Viscosity of Y-Z, measured at 25° C. and an acid number of about 7-10) | |
| Silicone Solution (1% solids in Xylene of Silicone SF69) | 0.17 |
| Polymethyl methacrylate Solution (40% solids in a mixture of toluene/acetone of polymethyl methacrylate having a relative viscosity of 1.19 measured on a 0.5% polymer solids solution using dichloroethylene solvent at 25° C.) | 37.38 |
| Methyl methacrylate/diethyl amino ethyl methacrylate copolymer solution (40% solids in a mixture of toluene/acetone of a copolymer of 99% methyl methacrylate and 1% diethyl amino ethyl methacrylate having a relative viscosity of 1.2 measured as above.) | 67.40 |
| Methyl methacrylate/butyl acrylate copolymer solution (40% solids in a mixture of toluene/acetone of a copolymer of 82% methylmethacrylate 18% butylacrylate having a relative viscosity of 1.19 measured as above.) | 109.90 |
| Iminated Polymer Solution (39% solids in toluene/isopropanol of a polymer of methyl methacrylate/ethyl acrylate/methacrylic acid/ post reacted with propyleneimine in a weight ratio of 81/14.6/4.4/2.9 and the polymer has a relative viscosity measured as above of 1.2) | 11.36 |
| Cellulose Acetate Butyrate (CAB) solution (20% CAB having a 37% butyryl content and a viscosity of 20 seconds in a solvent of acetone and ethanol) | 41.83 |
| CAB Solution (20% CAB having a butyryl content of 37% and a viscosity of 2 seconds in a solvent of acetone and ethanol) | 70.58 |
| White Mill Base (55% titanium dioxide pigment, 8% acrylic resin and 37% solvent of toluene and "Cellosolve" acetate | 109.12 |
| Yellow Mill Base (22% yellow iron oxide pigment, 19% acrylic resin and 59% toluene | 1.11 |
| Total | 556.02 |

About 67 parts of the above white acrylic lacquer and 33 parts of the above additive were blended together to form paint 1 and the resulting paint was sprayed onto a panel of a thermoplastic polyurethane flexible substrate and dried tack free at ambient temperature in 15 minutes. The gloss, distinctness of image, flexibility at room temperature and at −28° C. and gasoline resistance was measured and the panel was then exposed to outdoor weathering in Florida for 6 months and the gloss at 60° was measured and % gloss retention was determined. The results of these tests were recorded in the Table.

The following paints were formulated using commercial products which are used to improve flexibility of finishes.

| | Paint A |
|---|---|
| 1 Part | Du Pont Additive (22% solids of 12 parts polymer of methyl methacrylate/3-(2-methacryloxy ethyl)-2,2-spiro cyclohexyl oxazolidene 95/5 ratio, 48 parts of polymer of methyl methacrylate/butyl acrylate 85/15 ratio, 40 parts butyl benzyl phthalate in a solvent of acetone and isopropanol) |
| 1 Part | White acrylic lacquer (prepared above) |
| | Paint B |
| 1 Part | Morton's Impact Coating (31% solids of 72 parts polymer of methyl methacrylate/butyl acrylate/butyl methacrylate/hydroxy propyl methacrylate 66/11/17/4 ratio, 18 parts polyester of butylene glycol/ethylene glycol and lauric/myristic/palmitic/stearic/oleic/adipic/o-phthalic acids, ratio of acids to glycol is 3/1 and the polyester has a weight average molecular weight of 13,000 and 10 parts dioctyl phthalate in a solvent of toluene and "Cellosolve") |
| 1 Part | White acrylic lacquer (prepared above) |
| | Paint C |
| 1 Part | Inmont's Additive (19% solids of polyester of dipropylene glycol adipate chain extended with 1,6-hexamethylene diisocyanate and having a weight average molecular weight of 23,000 in a solvent of ethyl acetate and "Cellosolve") |
| 1 Part | White acrylc lacquer (prepared above) |
| | Paint D |
| 1 Part | Ditzler's Additive (50% solids of a resin of polycaprolactone, polypropylene glycol and 3,-isocyanato-methyl-3,3,5-trimethyl cyclohexyl isocyanate in a molar ratio of about 50/50/2, the resin is isocyanate terminated and has a weight average molecular weight of 23,000 in a solvent of methyl ethyl ketone and toluene) |
| 4 Parts | White acrylic lacquer (prepared above) |

Each of the above paints A-D were each applied to a separate flexible substrate described above as the paint made with the additive of this invention and dried tack free at ambient temperature and gloss, distinctness of image, flexibility at room temperature at −28° C. and gasoline resistance for each was measured and 60° gloss retention was determined after 6 months outdoor weather in Florida. The results are shown in the Table.

The gloss and distinctness of image (DOI) of all the paints was above equivalent. The flexibility of Paint 1 containing the additive of the invention was better than Paint A and about equivalent to the other paints and the flexibility of Paint 1 at −28° C. was equal to Paint D and better than the other paints. The gasoline resistance of Paint 1 was better than the other paints. The outstanding feature is that Paint 1 has substantially better gloss retention after exposed to outdoor weathering in Florida for 6 months in comparison to the Paints A-D.

TABLE

| Additive | DRY TIME | Gloss 20° | Gloss 60° | DOI* | Flex Room Temp. | −28° C. | Gasoline Resistance | 60° Gloss Retention 6 mos. Florida |
|---|---|---|---|---|---|---|---|---|
| Paint 1 Invention Additive | 15 min. | 52 | 84 | 50 | 9 | 8 | 5 | 71% |
| Paint A Du Pont Additive | 15 min. | 58 | 83 | 50 | 7 | 7 | 4 | 48% |
| Paint B Morton | 15 min. | 56 | 81 | 50 | 10 | 5 | 4 | 34% |
| Paint C Inmont's Additive | 15 min. | 53 | 81 | 50 | 10 | 6 | 3 | 33% |
| Paint D Ditzler's Additive | 15 min. | 52 | 80 | 50 | 9 | 8 | 4 | 27% |

*DOI-Distinctness of Image
Ratings
Flexibility - 10 - excellent no cracks, 7 acceptable, below 7 unacceptable
Gasoline Resistance - 5 - excellent, 3 acceptable - some paint peeling off, below 3 unacceptable

EXAMPLE 2

A black nitrocellulose lacquer was prepared by blending together the following constituents:

| | Parts By Weight |
|---|---|
| Isopropanol | 22.19 |
| Xylene | 10.71 |
| Toluene | 68.11 |
| Aromatic petroleum naphtha | 7.43 |
| Blown castor oil | 0.82 |
| Copper naphthenate | 0.97 |
| Alkyd resin solution (described in Example 1) | 10.15 |
| Carbon black mill base (11% carbon black, 30% acrylic resin 60% solvent of toluene/isopropanol) | 47.56 |
| Nitrocellulose (½ second viscosity dehydrated with isopropanol) | 80.82 |
| Nitrocellulose (5-6 second viscosity dehydrated with isopropanol) | 13.48 |
| Ethylene glycol monoethyl ether acetate | 23.06 |
| Butyl acetate | 33.01 |
| Methy isobutyl ketone | 7.53 |
| Acetone | 117.06 |
| Butyl benzyl phthalate | 23.73 |
| Trixylene phosphate | 2.87 |
| Copolymer solution (43% solids copolymer of methyl methacrylate/butyl acrylate in solvents of acetone/toluene) | 39.72 |
| Silicone solution (20% silicone resin in xylene) | 3.28 |
| Total | 512.50 |

About 264.5 parts of the additive of this invention, prepared in Example 1, were blended with the above black lacquer and the resulting composition was sprayed onto a thermoplastic polyurethane flexible substrate and dried in 15 minutes to a tack free state at ambient temperatures. The gloss at 20° was 64, at 60° 91 and the distinctness of image was 40. The flexibility at room temperature was 9 and at −28° C. was 8. Gasoline resistance was 4. 60° gloss retention after 6 months weathering in Florida was 90%. The same tests and ratings were used in Example 1.

EXAMPLE 3

A white alkyd-acrylic resin paint was formulated by blending the following constituents:

| | Parts By Weight |
|---|---|
| Alkyd resin solution (55% solids of a coconut oil/dehydrated castor oil fatty acids-pentaerythritol/benzoic acid-pentaerythritol/phthalic anhydride/with excess pentaerythritol in a weight ratio of 4.6/41.2/10.0/38.9/6.5) | 199.51 |
| White mill base (58% titanium dioxide pigment, 15% acrylic resin, 27% aromatic solvent) | 176.03 |
| Yellow mill base (40% ferric yellow pigment, 22% acrylic resin, 38% xylene) | 0.63 |
| Black mill base (12% carbon black pigment, 31% acrylic resin, 56% xylene) | 0.21 |
| Acrylic vinyl oxazoline polymer solution (59% polymer solid of polymer of methyl methacrylate, butyl methacrylate, hydroxy ethyl methacrylate, diethyl amino ethyl methacrylate and vinyl oxazoline ester of linseed oil fatty acids in weight ratio of 40/33/7/5/15 in toluene) | 165.52 |
| Cobalt Drier Solution | 5.82 |
| Xylene | 69.59 |
| VM&P naphtha | 43.52 |
| Turpentine | 6.66 |
| Aromatic hydrocarbon | 33.29 |
| Total | 700.70 |

About 160 parts of the additive of this invention, prepared in Example 1, were blended with the above with alkyd acrylic resin paint and the resulting composition was sprayed onto a thermoplastic polyurethane flexible substrate and dried in 30 minutes to a tack free state at ambient temperatures. The gloss at 20° was 80, at 60° 90, flexibility at room temperature was 10 and at −28° C. was 8. Gasoline resistance was 4. 60° Gloss retention after 6 months weathering in Florida was 84%. The same tests and ratings were used as in Example 1.

EXAMPLE 4

The following constituents were blended together to form an additive:

| | Parts by Weight |
|---|---|
| Ethyl acetate | 66.30 |
| Diethylene glycol monobutyl ether | 7.43 |
| Toluene | 69.62 |
| Polyethylene glycol di | 9.90 |

| | Parts by Weight |
|---|---|
| (2-ethylhexoate) | |
| 2-[2'-hydroxy-3',5'-(1-1-dimethyl-propyl) phenyl] benzotriazole | 7.41 |
| Di-[4-(2,2,6,6,-tetramethyl-piperidyl)] sebacate | 3.71 |
| "Desmodur" N3390-isocyanurate trimer of formula | 105.31 |
| | 269.68 |

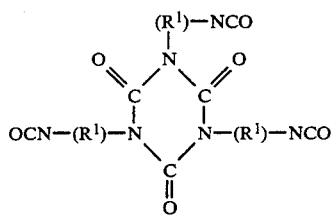

where $R^1$ is $(CH_2)_6$

About 67 parts of the white acrylic lacquer prepared in Example 1 and 33 parts of the above additive were blended together to form a paint and the resulting paint was sprayed onto a panel of thermoplastic polyurethane flexible substrate and dried tack free at ambient temperature in 15 minutes. Later, the gloss, distinctness of image, flexibility at room temperature and at −28° C. and gasoline resistance were measured. The results are very similar to paint 1 of Example 1 shown in the Table.

About 264.5 parts of the above additive were blended with 512 parts of the black lacquer of Example 2 and the resulting composition was sprayed onto a panel of thermoplastic polyurethane flexible substrate and dried in 15 minutes to a tack free state at ambient temperatures. The gloss at 20° and 60°, the distinctness of image and flexibility at room temperature and at −28° C. and gasoline resistance were measured. The results are very similar to those obtained in Example 2.

About 160 parts of the above additive were blended with the above 700 parts of the alkyd acrylic resin paint of Example 3 and the resulting composition was sprayed onto a panel of a thermoplastic polyurethane flexible substrate and dried in 30 minutes to a tack free state at ambient temperatures. The gloss at 20° and 60°, flexibility at room temperature and at −28° C. and gasoline resistance were measured. The results are very similar to those obtained in Example 3.

I claim:

1. An additive for coating compositions which comprises about (A) 20–50% by weight of a polyisocyanate of the formula $$\begin{array}{c} (R^1)-NCO \\ | \\ O \diagdown N \diagup O \\ \diagdown C \diagup \diagdown C \diagup \\ OCN-(R^1)-N \qquad N-(R^1)-NCO \\ \diagdown C \diagup \\ \| \\ O \end{array}$$

where R' is $(CH_2)_6$;

(B) 1–15% by weight of an ester of [polyethylene glycol diethylhexoate]polyethylene glycol di(2-ethylhexoate);

(C) 1–10% by weight of a blend of ultraviolet light stabilizers consisting essentially of 2-[2'-hydroxy-3',5'-1(1-1-dimethylpropyl)phenyl]benzotriazole and di-[4-(2,2,6,6-tetramethyl-piperidyl)]sebacate and (D) 25–78% by weight of organic solvent comprising ethyl acetate, toluene and diethylene glycol monobutyl ether.

2. A coating composition containing 10–70% by weight of a binder and 90–30% by weight of a liquid carrier and containing about 10–100% by weight, based on the weight of the coating composition of the additive of claim 1.

3. The coating composition of claim 2 in which the composition contains pigments in a pigment to binder weight ratio of about 1:100 to 200:100.

4. The coating composition of claim 3 in which the binder comprises an acrylic polymer.

5. The coating composition of claim 3 in which the binder comprises a nitrocellulose polymer.

6. The coating composition of claim 3 in which the binder comprises an acrylic vinyl oxazoline ester polymer.

7. The coating composition of claim 3 in which the binder comprises an acrylic resin containing reactive hydroxyl groups and a polyisocyanate crosslinking resin.

8. A flexible substrate coated with the composition of claim 2.

9. The flexible substrate of claim 8 in which the substrate is a thermoplastic polyurethane.

10. The flexible substrate of claim 8 which the substrate is an injection molded polyurethane.

* * * * *